United States Patent [19]

Woelkers

[11] 4,171,123

[45] Oct. 16, 1979

[54] CONDUCTOR PULLING DEVICE

[76] Inventor: Virgil N. Woelkers, 8695 Oakside Dr., Union Lake, Mich. 48085

[21] Appl. No.: 904,923

[22] Filed: May 11, 1978

[51] Int. Cl.$^2$ ............................................. F21C 29/16
[52] U.S. Cl. .......................................... 254/134.3 FT
[58] Field of Search .............. 254/134.3 FT, 134.3 R, 254/134.5; 15/104.3 SN; 248/68 R, 74 R, 60

[56] References Cited

U.S. PATENT DOCUMENTS

| | | | |
|---|---|---|---|
| 2,648,326 | 8/1953 | Epstein | 248/60 |
| 2,727,720 | 12/1955 | Barth | 254/134.3 FT |
| 3,081,977 | 3/1963 | Weisgerber | 254/134.3 FT |
| 3,330,533 | 7/1967 | Blume | 254/134.3 FT |
| 3,858,848 | 1/1975 | MacFetrich | 254/134.3 FT |
| 3,979,106 | 9/1976 | Jaques | 254/134.3 FT |
| 4,101,114 | 7/1978 | Martin et al. | 254/134.3 FT |

*Primary Examiner*—Robert C. Watson
*Attorney, Agent, or Firm*—McGlynn and Milton

[57] ABSTRACT

A conductor pulling device for pulling conductors through a conduit. A pulling member for independently receiving conductors consists of an elongated strip of material having a plurality of spaced openings therealong. The openings have a top portion which is larger than the bottom portion to provide a biting portion of each opening for biting into insulation disposed about a conductor when a portion of the conductor is inserted in one of the openings. The biting portion of the openings allows the conductors to be detachably retained to the strip while the conductors are pulled through a conduit. The elongated strip is connected to a fish tape by an aperture in the strip which receives a hook portion of the fish tape. Additionally, a hood made of organic polymeric material may be used to hold the conductors in place when the conductors are inserted through respective openings in the elongated strip and to reduce friction with the conduit. Still further, there is disclosed a method of pulling a plurality of conductors through a passage using the above-described conductor pulling device to individually and independently retain the individual conductors to respective openings while pulling the pulling member through a passage. More specifically, the method comprising the steps of inserting a portion of a conductor through one of the openings and urging that portion into engagement with the biting portion so that the biting portion of the opening bites into the insulation of the conductor to insure a positive grip, connecting the strip to a pulling means and pulling the pulling means thereby pulling the strip with the conductors attached thereto through a conduit.

18 Claims, 4 Drawing Figures

CONDUCTOR PULLING DEVICE

BACKGROUND OF THE INVENTION

(1) Field of the Invention

The subject invention relates to pulling wires or conductors through a conduit. In the electrical construction industry which employs electrical systems involving underground wiring for utilities, wiring in elevators, wiring in buildings and the like, a frequent operation involves pulling conductors or insulated wires through a conduit such as a pipe, duct, raceway, etc. In such applications, quite often there are a series of drops or, in other words, one or more conductors are generally required to be dropped off or added on at certain points or junctions along a conduit, etc.

(2) Description of the Prior Art

In the past, conductors or insulated wires were pulled through a conduit by stripping part of the insulation off of the end of a plurality of conductors and bending the exposed wires into loops or eyes and then inserting the hook portion of a fish tape into the loops. In order to prevent the loops from opening while being pulled through the conduit, the ends of the exposed wires are taped to the adjacent conductors. As a result, the area where the exposed wire ends and conductors are taped together become quite bulky which results in the possibility of getting stuck or hanging up inside the conduit. This possibility is further increased if the conductors must go through bends or curves in the path of the conduit, as is frequently the case. It is also apparent that if there are a series of conduits wherein one or more conductors are to be dropped off or added on at certain points or junctions, the tape must be removed to release the selected conductors and then the above process repeated with the remaining conductors. A still further problem is that if someone is pushing the conductors to aid the person pulling the fish tape and the push is greater than the pull, the loops may become disengaged from the hook of the fish tape thus causing more time delay in retrieving the conductors and starting over again. Additionally, the hook of the fish tape must extend a considerable length in order to properly engage the loops which causes the problem of the hook itself getting stuck in the conduit. Also, the prior art fish tapes have coils which eliminate the necessity of taping by allowing winding of the wires around the coils; however, the prior art devices are not adapted to be used with conductors of heavy gauge and do not solve all of the problems associated with pulling conductors.

SUMMARY OF THE INVENTION

The subject invention relates to a conductor pulling device comprising a pulling member for independently receiving a plurality of conductors. Connection means connect the pulling member to a pulling means in order to allow the pulling member and the conductors received thereby to be pulled through a conduit. Retaining means detachably retain the conductors, individually and independently, to the pulling member to allow the conductors to be pulled through a conduit with the conductors being retained to the pulling member at spaced positions along the pulling member.

Additionally, the subject invention teaches a method of pulling conductors through a conduit with a pulling member having spaced openings therealong comprising the steps of; inserting an end portion of each conductor through one of the openings with each opening accepting one of the conductors whereby each conductor is individually and independently retained to the pulling member, and pulling the pulling member through a passage.

PRIOR ART STATEMENT

U.S. Pat. No. 3,081,977 granted to W. C. Weisgerber on Mar. 19, 1963 relates to an apparatus for pulling or feeding wires through conduits. This patent discloses several longitudinal coils at the end of a fish tape which allows wires to be wrapped into the coils and then fed through a conduit. Additionally, a notch may be provided for receiving the wires as an added precaution against disattachment. However, all of the wires are attached to the member together as a unit. The subject invention is an improvement thereover by individually and independently detachably retaining the perspective conductors to a pulling member at spaced positions so that the pulling member and the conductors attached thereto may be pulled through a conduit whereby each conductor may be individually handled.

U.S. Pat. No. 3,330,533 granted to W. E. Blume on July 11, 1967 discloses a fish tape terminating in wire loops which may be pulled through a relatively long conduit by inserting the fish tape through one end of the conduit and by inserting a pulling or snagging device through the opposite end of the conduit to engage the wire loops of the fish tape which allows the fish tape to be pulled through the remaining length of the conduit. The pulling or snagging device disclosed in this patent consists of a twisted hook terminal including offset slots having enlarged notches for engaging the wire loops and pulling the fish tape through the conduit. This patent does not, however, suggest attaching and detachably retaining conductors independently of one another to a pulling member to allow the conductors to be pulled through a conduit.

U.S. Pat. No. 3,858,848 granted Jan. 7, 1975 to R. H. MacFetrich discloses a fish tape having a friction-resistant sheath or jacket in order to easily slide through a conduit. This patent, however, is directed to the construction of the fish tape and discloses a transverse eye opening for the attachment of conductors to be pulled into a conduit.

None of these prior art patents suggest a pulling member for individually and independently receiving and retaining a plurality of respective conductors for pulling the conductors. Additionally, none of the patents discussed above disclose a method of pulling conductors through a conduit with a strip having spaced openings therealong with the conductors being individually and independently retained in the respective openings while being pulled through a passage.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
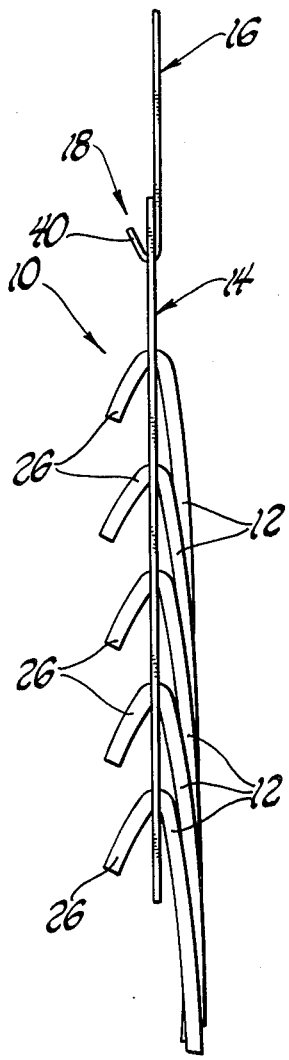
FIG. 1 is an elevational side view of a conductor pulling device constructed in accordance with the instant invention with a plurality of conductors retained thereto.
Figure 2:
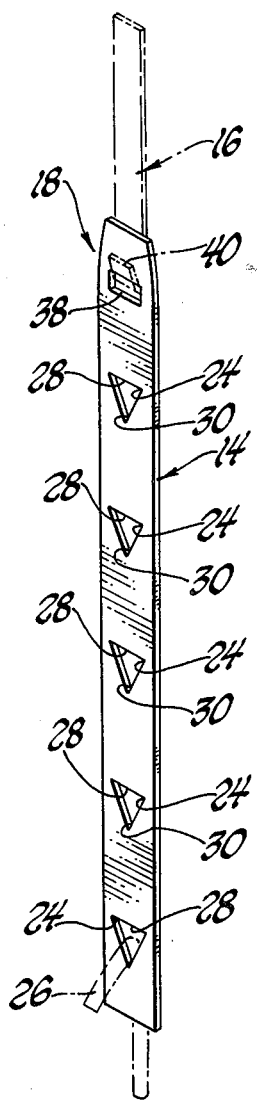
FIG. 2 is a perspective view of a perferred embodiment of the pulling member of the subject invention.
Figure 3:
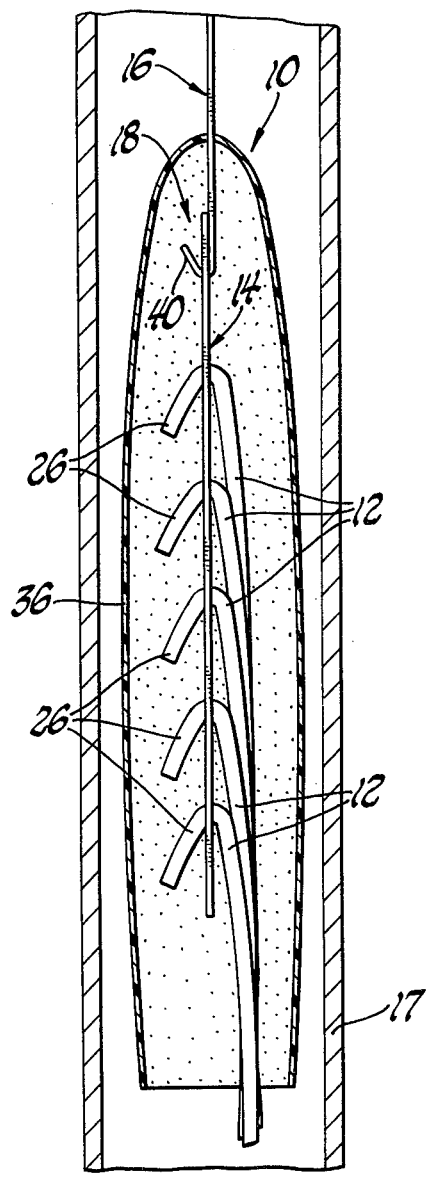
FIG. 3 is an elevational side view partially in cross section of the instant invention within a conduit and associated with a hood.

Referring to the drawings generally, a conductor pulling assembly constructed in accordance with the subject invention is generally shown at 10. The assembly 10 includes a pulling member, generally indicated at 14 and pulling means, generally indicated at 16. As shown in FIGS. 1, 2 and 3, a plurality of conductors 12, may be independently received by the pulling member 14 and pulled through a conduit. The conduit is usually of the type generally used in the electrical construction industry and is illustrated at 17 in FIG. 3, it being understood that the subject invention relates to pulling elements through any passage.

Referring to FIGS. 1, 2 and 3, the assembly 10 includes connection means generally shown at 18 for connecting the pulling member 14 to the pulling means 16 whereby the pulling member 14 and the conductors 12 received thereby may be pulled through the conduit 17.

Figure 4:
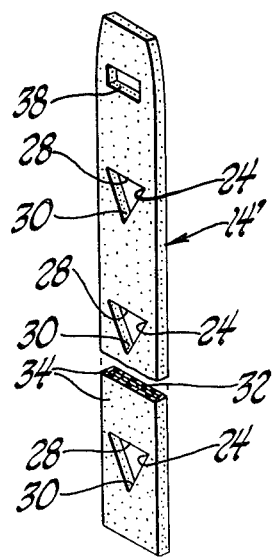
FIG. 4 is a perspective view similar to FIG. 2 but showing the pulling member having a coating of organic polymeric material.

The pulling member 14 is comprised of an elongated strip of material having a plurality of spaced openings 24 therealong for independently receiving respective conductors 12. Retaining means for individually and independently detachably retaining the respective conductors 12 to the pulling member 14 allows the conductors 12 to be pulled through the conduit 17 with the conductors 12 being individually retained to the pulling member 14 at spaced positions along the pulling member 14. The retaining means is defined by a biting portion in each of the openings 24 for biting into insulation disposed about a conductor 12 as an end portion 26 of each conductor 12 is inserted in one of the openings 24. The biting portion of each opening 24 is provided as each opening 24 has a top portion 28 and a bottom portion 30 with the top portion 28 being larger than the bottom portion 30. Referring to FIGS. 2 and 4, the openings 24 have a triangular configuration and the biting portion is defined by the apex of the triangle forming the smaller or bottom portion 30 and the sides of the triangular shaped opening 24 extending from the apex. The apex defining the biting portion 30 extends in a direction away from the connection means 18 so that the bottom biting portion 30 of the opening 24 tends to bite into the associated conductor as the member 14 is pulled through a conduit. Thus, an end portion 26 of each of the conductors 12 may be inserted through the larger top portion 28 of one of the openings 24 and bent as illustrated in FIGS. 1, 2 and 3 and pulled or pushed downwardly so as to be urged into engagement with the smaller bottom portion 30 which provides the biting portion for biting into the insulation of a conductor 12 to thereby detachably retain each conductor 12 to the pulling member 14. Alternatively, the end portions 26 may first be bent and then inserted into an opening 24.

As illustrated, the openings 24 are comprised of individual closed holes spaced along the member 14. It is also possible, however, to form the openings by open slots disposed along the edges of the member 14. It is also possible to have various other configurations of the holes 24 wherein the holes 24 have a top portion which is larger than the bottom portion. For example, the holes 24 may be defined by a hole which has a downwardly extending slot or notch which is smaller than the top portion of the opening to form a biting portion for biting into the insulation disposed about a conductor 12. In any event, the openings will have a biting portion for biting into the insulation disposed about a conductor.

The elongated strip 14 has a flat planar configuration. The strip 14 is made of flexible material in order to allow the strip 14 to be pulled around curves or bends in the conduit 16. Referring to FIGS. 1, 2 and 3, the strip 14 may be made of metal or of an organic polymeric material which would reduce friction between the pulling member 14 and the conduit 16. Alternatively, and as shown in FIG. 4, the strip 14' may be made of a metal core 32 with an organic polymeric or plastic coating 34 on the surface of the metal core 32 whereby the friction between the pulling member 14 and the conduit 16 is reduced in order to allow the pulling member 14 to easily slide through the conduit 16.

As illustrated in FIG. 3, a hood 36 may be used which would aid in holding the conductors 12 in place to the pulling member 14. The hood 36 is made of or coated with an organic polymeric material to, again, reduce friction. The hood 36 is like a boot or bag with an opening to allow the pulling means 16 to extend therethrough while preventing the member 14 to pass therethrough.

The connection means 18 includes an aperture 38 in the elongated strip 14 and a hook portion 40 of the pulling means 20. The pulling means 20 may be a typical and well-known fish tape or snake line as used in the electrical construction industry for pulling or feeding conductors through a conduit.

In operation, the end portion 26 of a conductor 12 is inserted through the top portion 28 of an opening 24 and then bent and pushed or pulled downwardly into the smaller bottom portion 30 of the opening 24 which will bite into the insulation around the conductor 12 to sufficiently retain the conductor 12 to the pulling member 14. Thus, one or more conductors 12 may each be individually and independently retained to the member 14 as each opening 24 receives one such conductor. The hook portion 40 of the pulling means or fish tape 16 is inserted through the aperture 38 of the pulling member 14 and the pulling means or fish tape 16 is pulled in order to pull the pulling member 14 with the conductors 12 independently received thereby through a conduit 17. The respective conductors 12 are individually and independently detachably retained to the pulling member 14 by the retaining means which is defined by the biting portion of the openings 24 and are individually retained to the pulling member 14 at spaced positions along the pulling member 14. In other words, each conductor 12 is individually retained to the pulling member 14 in order to allow the conductors 12 to be individually and independently dropped off or added on if there are a series of drops or junctions where individual conductors are added on or dropped off.

Thus, the subject invention teaches a method of pulling conductors 12 through a conduit 17 with a pulling member 14 having spaced openings 24 therealong. The method comprises the steps of inserting an end portion 26 of each conductor 12 through one of the openings 24 with each opening 24 accepting one of the conductors 12 whereby each conductor 12 is individually and independently retained to the pulling member 14 and pulling the pulling member 14 through a passage such as conduit 17.

Also, the subject invention teaches a method of pulling conductors 12 through a conduit 17 with a strip 14 having spaced openings 24 therealong and with each of the openings 24 having a biting portion for biting into insulation disposed about the conductors 12. The method includes the steps of inserting a portion 26 of the conductor 12 through one of the openings 24 and urging the portion 26 of the conductor 12 inserted through the opening 24 into engagement with the biting portion 30 so that the biting portion 30 bites into the insulation of the conductor to insure a positive grip. As alluded to above, the end portions 26 may be bent before or after being inserted in the openings and the degree of bend may vary. The method also includes the steps of connecting the strip 14 to a pulling means 16 and pulling the pulling means 16 and thereby pulling the strip 14 with the conductors 12 attached thereto through a conduit 17.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A conductor pulling device comprising; a pulling member having opposed flat faces and a plurality of spaced openings therealong and extending between said opposite faces for independently receiving a plurality of conductors, said opposed faces being smooth and devoid of any projections, connection means for connecting said pulling member to a pulling means whereby said pulling member and the conductors received thereby may be pulled through a conduit, retaining means associated with each of said openings for individually and independently detachably retaining the respective conductors to said pulling member to allow the conductors to be pulled through a conduit with the conductors being individually retained to said pulling member at spaced positions along said pulling member, all of said spaced openings being identical in configuration with all of said openings and associated retaining means being oriented identically relative to said connection means.

2. A device as set forth in claim 1 wherein said retaining means is defined by a biting portion in each of said openings for biting into insulation disposed about a conductor when a portion of the conductor is inserted in one of said openings, all of said openings in said member having a biting portion, each of said biting portions being on the extremity of the associated opening opposite to said connection means.

3. A device as set forth in claim 2 wherein said openings comprise spaced holes along said strip.

4. A device as set forth in claim 2 wherein said biting portion includes each of said openings having a top portion which is larger than the bottom portion.

5. A device as set forth in claim 4 wherein said openings have a triangular configuration and said biting portion includes an apex and a portion of the sides of each of said triangular shaped openings extending from said apex.

6. A device as set forth in claim 1 wherein said pulling member comprises an elongated strip of material.

7. A device as set forth in claim 6 wherein said connection means includes an aperture in said elongated strip for receiving a hook portion of the pulling means.

8. A device as set forth in claim 6 wherein said strip is made of metal.

9. A device as set forth in claim 8 including an organic polymeric coating on the surface of said metal strip whereby the friction between said pulling member and the conduit is reduced.

10. A device as set forth in claim 6 wherein said strip is made of an organic polymeric material.

11. A device as set forth in claim 1 including a hood for aiding in holding the conductors in place to said pulling member.

12. A device as set forth in claim 11 wherein said hood is made of an organic polymeric material.

13. A conductor pulling assembly comprising; the combination of a pulling member having retaining means for detachably retaining a plurality of conductors to said pulling member to allow the conductors to be pulled through a conduit with the conductors being retained to said pulling member at spaced positions along said pulling member pulling means for pulling said pulling member and the conductors attached thereto through a conduit, and connection means for connecting said pulling member to said pulling means, said pulling member comprising an elongated strip of material having spaced openings therealong and said retaining means being defined by a biting portion in each of said openings for biting into insulation disposed about a conductor when a portion of the conductor is inserted in one of said openings.

14. An assembly as set forth in claim 13 wherein said pulling means includes a fish tape.

15. An assembly as set forth in claim 14 wherein said biting portion includes each of said openings having a top portion which is larger than the bottom portion.

16. An assembly as set forth in claim 13 wherein said connection means includes a hook portion associated with said pulling means and an aperture in said strip for receiving said hook portion.

17. A method of pulling conductors through a conduit with a strip having spaced openings therealong and with each of the openings having a biting portion for biting into insulation disposed about the conductors including the steps of; inserting a portion of a conductor through one of the openings and urging the portion of the conductor inserted through the opening into engagement with the biting portion so that the biting portion bites into the insulation of the conductor to insure a positive grip.

18. A method as set forth in claim 17 including the steps of connecting the strip to a pulling means and pulling the pulling means and thereby pulling the strip with the conductors attached thereto through a conduit.

* * * * *